United States Patent
Stefan et al.

(10) Patent No.: US 9,050,935 B2
(45) Date of Patent: Jun. 9, 2015

(54) ASSESSMENT OF DRIVING BEHAVIOR OF A DRIVER OF A MOTOR VEHICLE

(71) Applicant: Ford Global Technologies, LLC, Dearborn, MI (US)

(72) Inventors: Frederic Stefan, Aachen (DE); Urs Christen, Aachen (DE); Ryan Abraham McGee, Ann Arbor, MI (US); Uwe Gussen, Huertgenwald (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/018,249

(22) Filed: Sep. 4, 2013

(65) Prior Publication Data

US 2014/0088858 A1 Mar. 27, 2014

(30) Foreign Application Priority Data

Sep. 26, 2012 (DE) .......................... 10 2012 217 403

(51) Int. Cl.
| | |
|---|---|
| *G07C 5/08* | (2006.01) |
| *G09B 19/16* | (2006.01) |
| *B60W 30/18* | (2012.01) |
| *B60K 35/00* | (2006.01) |
| *B60R 16/023* | (2006.01) |
| *B60W 50/14* | (2012.01) |

(52) U.S. Cl.
CPC .......... *B60R 16/0236* (2013.01); *G09B 19/167* (2013.01); *B60W 2050/146* (2013.01); *B60W 2520/00* (2013.01); *B60W 2530/00* (2013.01); *B60W 30/18072* (2013.01); *B60K 2350/1092* (2013.01); *B60K 35/00* (2013.01); *Y02T 10/00* (2013.01); *G07C 5/0825* (2013.01); *G07C 5/0841* (2013.01); *F02D 2200/00* (2013.01); *F02D 2200/606* (2013.01)

(58) Field of Classification Search
None
See application file for complete search history.

(56) References Cited

U.S. PATENT DOCUMENTS 6,470,256 B1 * 10/2002 Cikalo et al. .................... 701/93
7,603,228 B2 10/2009 Coughlin
(Continued)

FOREIGN PATENT DOCUMENTS

| DE | 102009037875 A1 | 2/2011 |
|---|---|---|
| DE | 102010011088 A1 | 9/2011 |

(Continued)

OTHER PUBLICATIONS

Hiraoka, Toshihiro; Nishikawa, Seimei; Kawakami, Hiroshi; Driver-Assistance System to Encourage Spontaneous Eco-Driving Behavior, 18th ITS World Congress, p. 12, Oct. 16, 2011 to Oct. 20, 2011.*

*Primary Examiner* — Rami Khatib
*Assistant Examiner* — Jeffrey Boomer
(74) *Attorney, Agent, or Firm* — Julia Voutyras; Alleman Hall McCoy Russell & Tuttle LLP (57) ABSTRACT

Various embodiments relating to driving behavior of a driver of a motor vehicle are disclosed. In one embodiment, a method may include assessing driving behavior of the driver according to a comparison of a current value of a coasting characteristic relative to a reference value. The current value may be determined during operation of the motor vehicle. The reference value of the coasting characteristic may be determined from operation of the motor vehicle during at least one past operating phase or another duration. The method further includes displaying a visualization representative of assessed driving behavior of the driver.

6 Claims, 4 Drawing Sheets

(56) References Cited

U.S. PATENT DOCUMENTS

| | | | |
|---|---|---|---|
| 2007/0256481 A1* | 11/2007 | Nishiyama et al. | 73/113 |
| 2007/0276582 A1* | 11/2007 | Coughlin | 701/123 |
| 2009/0237019 A1* | 9/2009 | Yamakawa et al. | 318/400.09 |
| 2010/0030458 A1* | 2/2010 | Coughlin | 701/123 |
| 2011/0043346 A1* | 2/2011 | Hoffmeister | 340/438 |
| 2011/0125294 A1* | 5/2011 | Yu et al. | 700/33 |
| 2012/0035843 A1* | 2/2012 | Miura et al. | 701/123 |
| 2012/0078467 A1* | 3/2012 | Schweikl et al. | 701/36 |
| 2012/0078496 A1* | 3/2012 | Lindhuber et al. | 701/123 |
| 2012/0088629 A1* | 4/2012 | Aoyama et al. | 477/39 |
| 2012/0139922 A1* | 6/2012 | Heo | 345/440 |
| 2012/0209450 A1* | 8/2012 | Nagai et al. | 701/1 |
| 2012/0283940 A1* | 11/2012 | Smith | 701/123 |
| 2013/0226368 A1* | 8/2013 | Bruno et al. | 701/1 |
| 2013/0289874 A1* | 10/2013 | Taguchi | 701/533 |
| 2013/0311048 A1* | 11/2013 | Ahn | 701/48 |
| 2014/0032062 A1* | 1/2014 | Baer et al. | 701/51 |

FOREIGN PATENT DOCUMENTS

| | | |
|---|---|---|
| EP | 1741691 A1 | 1/2007 |
| EP | 1900588 A1 | 3/2008 |
| EP | 2012276 A2 | 1/2009 |
| EP | 2028058 A1 | 2/2009 |
| EP | 2028058 A3 | 12/2009 |
| JP | 2009145828 A | 7/2009 |
| JP | 2010030475 A | 2/2010 |
| JP | 2010042745 A | 2/2010 |
| JP | 2010151115 A | 7/2010 |
| JP | 2011073588 A | 4/2011 |

* cited by examiner

ASSESSMENT OF DRIVING BEHAVIOR OF A DRIVER OF A MOTOR VEHICLE

CROSS-REFERENCE TO RELATED APPLICATIONS

This application claims priority to German Patent Application No. 102012217403.6, filed on Sep. 26, 2012, the entire contents of which are hereby incorporated by reference for all purposes.

FIELD

The present disclosure relates to assessing driving behavior of a driver of a motor vehicle according to a coasting strategy.

BACKGROUND AND SUMMARY

In order to reduce fuel consumption during operation of a motor vehicle a strategy referred to as "coasting" may be employed. A coasting mode or coasting phase may occur when a driver releases an accelerator pedal of the motor vehicle and a drive train of the motor vehicle is automatically opened. The opening of the drive train may reduce or eliminate transfer of engine torque to the drive train in order to reduce drag. As a result of the drive train being opened, a coasting (or unpowered travel) distance of the motor vehicle may increase drastically. Correspondingly, the increase in the coasting distance of the motor vehicle results in a reduction in fuel consumption. Accordingly, it may be to a driver's benefit to maximize a costing distance traveled by the motor vehicle. Moreover, if a driver is instructed how to increase a coasting distance through operation of the motor vehicle according to a coasting strategy, the driver typically will exhibit driving behavior that results in a reduction in fuel consumption after only a short period of time.

Various strategies have been proposed related to tracking driver behavior. In one example, DE102009037875A1 discloses a method for determining a fuel savings during coasting of a motor vehicle relative to fuel consumption during other operation. In particular, actual fuel consumption is compared with stored values that depend on motor vehicle speed, road gradient, and other operating parameters.

In another example, EP2028058A2 discloses a motor vehicle including a display of information describing driving behavior in relation to fuel consumption. In particular, the driving behavior is characterized by a point scale or assessment scale that assesses how eco-friendly the driving style of the driver is in terms of accelerating, gear shifting and rolling behavior.

In another example, DE102010011088A1 discloses a device for displaying information in a motor vehicle that coaches a driver to optimize their driving style. The information relates to achieving a driving style that reduces fuel consumption and/or emissions of the motor vehicle. In particular, a graphical symbol is displayed in the motor vehicle if an actual value of fuel consumption is less than or greater than a stored base value, and the graphical symbol is enlarged depending on the detected deviations of the actual value from the base value.

However, the inventors herein have identified some potential issues with all of these approaches. For example, none of the approaches disclose the specific concept of motivating a driver of a motor vehicle to increase the use of a "coasting strategy" where the driver lifts their foot off the accelerator pedal in order to allow the drive train to open such that drag of the motor vehicle is reduced and the motor vehicle is allowed to travel unpowered. In another example, the above described approaches require a large variety of additional sensors (e.g., camera-based or GPS-based sensors) and complex network technologies between an infrastructure and the motor vehicle and between multiple motor vehicles, which leads to a comparatively high cost and also to a possible distraction of the driver. In another example, the above described approaches do not lead to a learning effect for the driver or change based on a driver's learning. Rather, the respective control units of the motor vehicle undertake the entire process including the decisions to be made, and merely compare actually values to saved reference values that do not change as the behavior of the driver changes.

Thus, in one example, some of the above issues may be at least partly addressed by a method for assessing a driver's ability to coast in a motor vehicle. The method may include assessing driving behavior of the driver according to a comparison of a current value of a coasting characteristic relative to a reference value. The current value may be determined during operation of the motor vehicle. The reference value of the coasting characteristic may be determined from operation of the motor vehicle during at least one past operating phase or another duration. The method further includes displaying a visualization representative of assessed driving behavior of the driver.

In one example, the coasting characteristic is a coasting distance ratio defined as a ratio of a distance traveled by the motor vehicle while coasting relative to an overall distance traveled by the motor vehicle and the reference value is an average coasting distance ratio for a designated duration or a relative maximum coasting distance ratio achieved by the driver for a designated duration.

In some embodiments, the method further includes presenting a challenge to the driver. The challenge may require the driving behavior of the driver to manipulate the current value of the coasting characteristic to meet challenge criteria.

By assessing the driving behavior of the driver based on a coasting characteristic and providing visual feedback of the assessed driving behavior, the driver may be made aware of and have an understanding of their driving behavior relative to a coasting strategy. Furthermore, by presenting a challenge to the driver that requires the current value of the coasting characteristic to be manipulated to meet challenge criteria, the driver may be motivated to use the "coasting strategy" as substantially as possible. Optimally, the driver may use continuous assessment of his driving behavior in relation to the coasting strategy (in the manner of a training system), whereby the distance traveled by the motor vehicle in the coasting mode can be optimized. Moreover, the current and reference values may be updated or learned over time, such that the assessment changes as the driver's driving behavior changes. In other words, the reference value is not a fixed reference value, but a processed learned value that is driver specific.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The present description relates to assessing driving behavior of a driver of a motor vehicle. More particularly, the present description relates to assessing the driver's driving behavior and motivating the driver to use a coasting strategy in which the driver operates the motor vehicle in a coasting mode. Operation in the coasting mode occurs when an accelerator pedal of the motor vehicle is released and a drive train of the motor vehicle is automatically opened to reduce drag. During the coasting mode, the motor vehicle travels unpowered. The coasting strategy may coach the driver to operate the motor vehicle in the coasting mode whenever possible, as conditions allow. In other words, a driver may be motivated to operate the motor vehicle in coasting mode as long as operation in the coasting mode does not degrade drivability of the motor vehicle. By coaching the driver to operate the motor vehicle in the coasting mode, the driver's driving style may be smoothed, and fuel economy of the motor vehicle may be increased.

Figure 1:
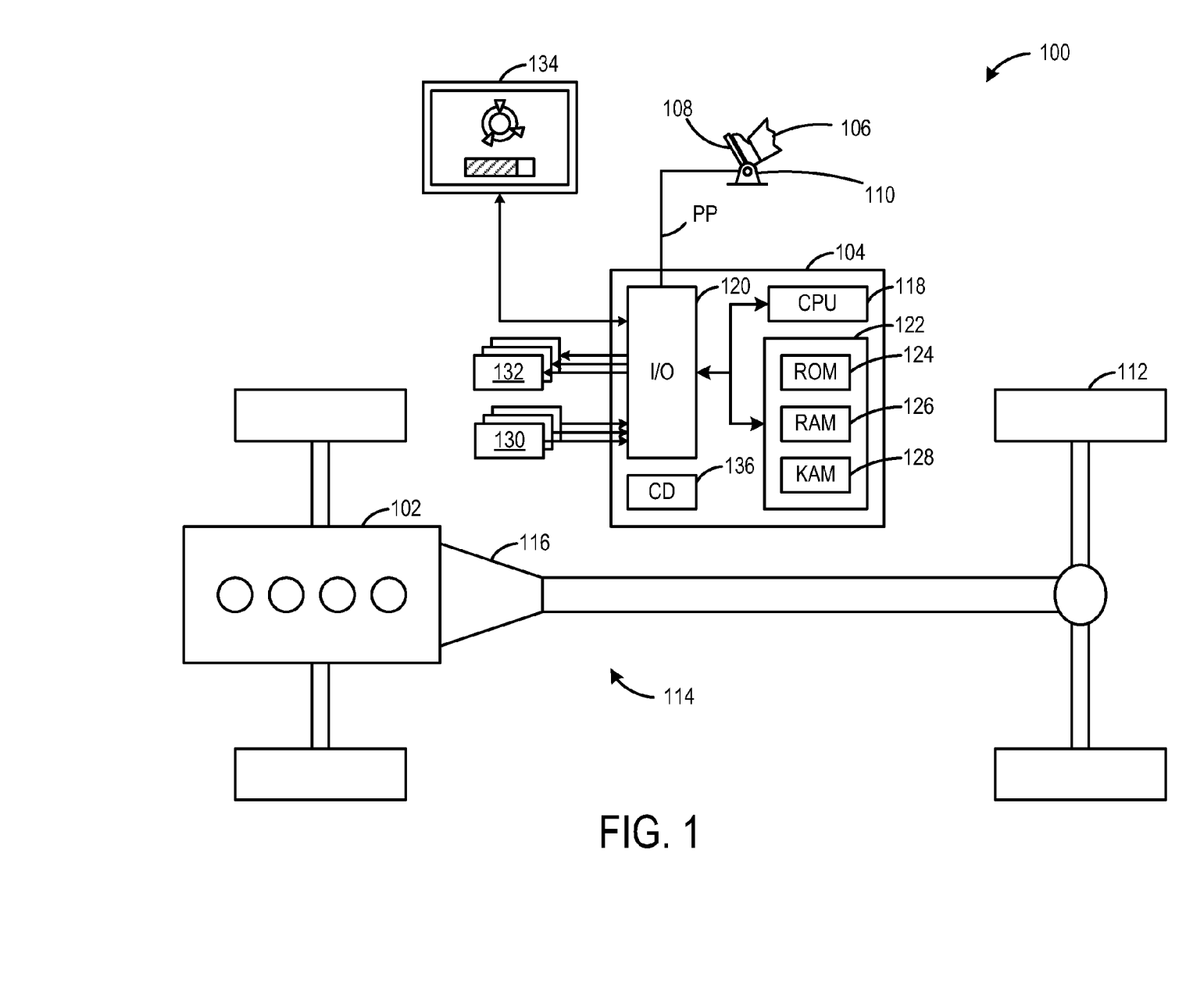
FIG. 1 shows a motor vehicle system according to an embodiment of the present disclosure.

FIG. 1 schematically shows a motor vehicle system 100. The motor vehicle system 100 includes a multi-cylinder engine 102. The engine 102 may be controlled at least partially by a control system including a controller 104 and by input from a vehicle operator (a.k.a., a driver) 106 via an input device 108. In this example, the input device 108 includes an accelerator pedal and a pedal position sensor 110 for generating a proportional pedal position signal PP. In some examples, the input device further includes a brake pedal. The engine 102 may be coupled to at least one drive wheel 112 via a drive train 114 that includes an intermediate transmission system 116.

The controller 104 is shown as a microcomputer including: a microprocessor unit 118, input/output ports 120, one or more storage devices 122 that includes read-only memory 124, random access memory 126, keep alive memory 128, and a data bus. The controller 104 is shown receiving various signals from sensors 130 coupled to the motor vehicle 100. Non-limiting examples of operating parameters determined from such sensor signals include engine coolant temperature (ECT), accelerator pedal position, engine manifold pressure (MAP) intake temperature (IT) or manifold temperature, engine/crankshaft position, exhaust temperature (ET), ambient temperature (AT), engine speed, and transmission position. Additional sensors may include a vehicle speed sensor, a throttle opening-degree sensor, an engine rotational speed sensor, a battery state of charge sensor, an ignition switch sensor, a brake switch sensor, a gear sensor, a driver request sensor, a global positioning system (GPS) location sensor, a vehicle travel distance sensor. It will be appreciated that one or more of the above described operating parameters may be inferred or determined in a manner other than being measured by a sensor. The controller 12 may also be coupled to various actuators 132 of the motor vehicle system and may be further configured to control the operation of the various actuators 132, including fuel injectors, ignition system, throttle valves, the transmission system, and a display device. The controller 104 may receive input data from the various sensors, process the input data, and trigger the actuators in response to the processed input data based on instruction or code programmed therein corresponding to one or more routines.

Storage medium read-only memory 106 can be programmed with computer readable data representing instructions executable by the processor 102 for performing the methods described below as well as other variants that are anticipated but not specifically listed.

The motor vehicle system 100 may be configured to operate in a coasting mode, under some conditions. In particular, the coasting mode may be initiated in response to the driver lifting a foot off of the accelerator pedal 108. In one example, in the coasting mode, the transmission system 116 decouples the engine 102 from the drive train 114, such that the engine 102 does not transmit power to the at least one drive wheel 112. In this way, the motor vehicle travels unpowered or coasts. The opening of the drive train may reduce or eliminate transfer of engine torque to the drive train in order to reduce drag. As a result of the drive train being opened, a coasting (or unpowered travel) distance of the motor vehicle may increase drastically.

To assess the driver's driving behavior and motivate the driver to operate the motor vehicle in the coasting mode, the motor vehicle may be configured to employ a coasting strategy. The coasting strategy may include various metrics for assessment of the driver's driving behavior. For example, a metric may be determined by comparing a current value of a characteristic variable (a.k.a., a coasting characteristic or a coasting variable) of the coasting strategy carried out during operation of the motor vehicle with a reference value. The driving behavior of the driver may be assessed on the basis of the comparison between the current value and the reference value. The reference value may be learned or accumulated over at least one past coasting phase (or multiple coasting phases) of the motor vehicle. A coasting phase may be defined as an uninterrupted period in which the motor vehicle is operated in the coasting mode. In some cases, if a coasting phase is interrupted independent of driver actions, then such an interruption may be disregarded when determining the characteristic value and assessing the driver's driving behavior. In some embodiments, the current value and the reference value may be driver specific. In other words, each driver's driving behavior may be tracked and assessed separately.

It will be understood that the above described reference value, in some embodiments may not be a previously determined and stored reference value. Rather, the reference value may be continually updated during operation of the motor vehicle. In one example, the reference value is reset for each driving cycle. By learning, updating, or resetting the reference value, the reference value may change as the driving behavior of the driver changes.

In some embodiments, the assessment of the driving behavior of the driver takes place depending on current driving conditions or traffic conditions. For example, under some driving conditions, the driver's driving behavior may not be accurately assessed due to driver independent interruptions in operation in the coasting mode. Non-limiting examples of driving conditions in which a driver's behavior may not be assessed include heavy traffic density conditions, and other very low speed travel conditions. In another example, during operation of the motor vehicle on a highway with moderate down gradients or with steep uphill gradients, coasting can be restricted or completely prevented. Furthermore, inhibition of coasting can take place in operating phases in which a shift lever is in an M position (for manual operation) or in an S position (for sport shifting), which is typically selected by the driver in order to increase the engine speed and the engine drag torque. Such driving conditions may be determined based on GPS information, traffic information, and other route information received from a remote computing device, vehicle speed, and other vehicle sensors. Assessment of the driver's driving behavior may be disregarded during such driving conditions. Conversely, driving conditions where the driver's driving behavior may be accurately assessed include expressway travel, cross-country travel, high speed travel, or other travel where there may be generally more opportunities for operation in the coasting mode.

In some embodiments, environmental conditions may be considered when determining whether or not to assess the driver's driving behavior. For example, environmental conditions where assessment of the driver's driving behavior may be disregarded include heavy rain conditions, freezing or snowy conditions, rough/off road conditions, etc. Such environmental conditions may be determined based on ambient temperature, weather information received from a remote computing device, a vehicle vibration sensor, and/or other environmental sensors.

In one example, the characteristic variable used in the metric to assess the driver's driving behavior includes a ratio (a.k.a., a coasting distance ratio) of a distance traveled in the coasting mode (a.k.a., a coasting distance) relative to a total distance traveled. The metric assumes that if the coasting distance ratio of the driver increases relative to the reference value or is generally high on an assessment scale, then the driver's driving behavior improves or is good. The coasting distance ratio may be dynamically processed or determined during operation of the motor vehicle.

In some embodiments, when a system-induced interruption of the coasting mode that is not the responsibility of the driver ends a coasting phase, the distance traveled during the interruption may be disregarded or not counted toward the determination of the coasting distance ratio. Furthermore, in some embodiments, a comparatively short coasting phase (e.g., with a time span of less than 2 seconds) is also disregarded when calculating the coasting distance ratio. Moreover, a manual reset of the coasting distance ratio by the driver can be enabled at any time, or may be automatically reset after a designated duration.

In one example, a calculation includes the determination of an event-based coasting distance ratio. With the event-based calculation method for the coasting distance ratio, the driver is informed regarding the driver's driving behavior at the end of each coasting phase. In other words, the refresh rate of the coasting distance ratio is dependent on how often the driver "coasts". With the calculation of an event-based coasting distance ratio, at the end of each coasting phase a filtered coasting distance ratio is calculated as follows:

$$r_n = \alpha_E \cdot r_{n-1} + (1 - \alpha_E) \cdot \frac{d_n}{\max(D_n, \beta_E)} \quad (1)$$

In which:
n: is the index of the coasting event;
E: relates to the processing method (E≅"event-based");
$d_n$: distance traveled of the coasting event n;
$D_n$: distance traveled from the end of coasting event n−1 until the end of coasting event n;
$\alpha_E$: filter constant, $0 \le \alpha_E \le 1$ (e.g. for a value of 0.99 new information is considered to be 1%);
$\beta_E$: minimal distance from event to event, used to prevent division by 0, $\beta_E > 0$;
$r_n$: coasting distance ratio for coasting event n, $0 \le r_n \le 1$;
$r_0$: initial value for the coasting distance ratio.

The value r0 of the initial value for the coasting distance ratio should be adjusted with care. A high value of the filter constant αE in combination with a very small initial value r0 for the coasting distance ratio causes e.g. the improvement of said initial value r0 to represent a great challenge for the driver. Conversely, a low value of the filter constant αE causes excessively high volatility of the coasting distance ratio. Here a good compromise is the aim, wherein a number of possibilities for setting the initial value for the coasting distance ratio are proposed:

The setting of a constant value that does not mean "penalizing" the driver (e.g., 0.5, 0.4, 0.3 . . . ), the selection of a different value for αE when initializing (e.g., zero), the selection of an increasing value for αE during the first N coasting events (e.g., with a value ramp αE from 0.5 through 0.99 during the first N coasting events), starting the processing and display of the filter following a specified number of coasting events (or a specified duration or distance) and assuming an average value of said events as the initial value.

In another example, a calculation includes the determination of a time window-based or distance window-based coasting distance ratio. With the time window-based calculation method for the coasting distance ratio, by contrast, the coasting distance ratio is continuously updated (even during the coasting phases or in phases in which there is no coasting). A filtered coasting distance ratio can hereby be calculated at a constant time rate (e.g., every 5 s) in a similar manner as for the previously described event-based coasting distance ratio as follows:

$$r_n = \alpha_W \cdot r_{n-1} + (1 - \alpha_W) \cdot \frac{d_n}{\max(D_n, \beta_W)} \quad (2)$$

where:
n: is the index of the coasting event;
W: relates to the processing method (W≅"time window-based");
$d_n$: is the distance traveled of coasting event n;
$D_n$: is the total distance traveled during the actual time window;
$\alpha_W$: is the filter constant, $0 \le \alpha_W \le 1$ (e.g. for a value von 0.99 new information is considered as 1%);
$\beta_W$: is the minimum coasting distance, used to prevent division by 0, $\beta_W > 0$;
$r_n$: is the coasting distance ratio for coasting event n, $0 \le r_n \le 1$;
$r_0$: is the initial value for the coasting distance ratio.

In another example, the characteristic variable includes a ratio (a.k.a., coasting time ratio) of an amount of time traveled in the coasting mode (a.k.a., a coasting time) relative to a total time traveled. The metric assumes that if the coasting time ratio of the driver increases to the reference value or is generally high on an assessment scale, then the driver's driving behavior improves or is good.

Continuing with FIG. 1, the motor vehicle system 100 includes a display device 134 that displays information relating to operating the motor vehicle in the coasting mode, an assessment of a driver's driving behavior, and other visualizations that motivate a driver to operate the motor vehicle in the coasting mode. In one example, the display device includes head-up display on an optional surface, e.g., in an area of a windscreen of the motor vehicle.

In some embodiments, the coasting strategy may include presenting one or more challenges for the driver on the display device 134. In one example, a challenge includes maintaining the coasting distance/time ratio within at least a designated range of values, such as upper and lower limits on an assessment scale. In one example, the range of values for the coasting distance ratio corresponds to the range of values within which the coasting distance ratio should lie, so that fuel saving is achieved with high probability. In particular, the recommended range of values is selected so that the values can be realistically achieved for the respective individual driver (e.g., at 25% through 35%). The recommended range of values can also be specified in relation to the respective current driving situation (e.g., expressway, high speed, urban, traffic congestion, etc.). For example, the recommended range of values for the coasting distance ratio can be selected to be higher during urban travel, for which there are more opportunities for coasting than during expressway travel. For detection of the current driving situation based on speed data and acceleration data, e.g., a method can be selected as disclosed in EP 1741591B1. The recommended range of values can furthermore also be dynamically shifted depending on the behavior of the driver. If a driver e.g., frequently succeeds in exceeding the upper limit value of the recommended range, both limit values of the range can be slightly increased, and vice-versa.

In another example, a challenge includes tracking and accruing a total coasting distance and/or a total coasting time for a driver. The totals may be tracked over a relatively long period of time and may be considered as a lifetime achievement. Further, the total coasting distance/time for a driver may be compared to total coasting distances/times for other drivers. In one example, totals may be sent from various vehicles to a centralized server computing device, and the server computing device may aggregate all of the totals and form driver rankings, leader boards, or other visualization of the totals. Such visualizations may be sent to the motor vehicles for display on the display device 134, presented in a web application, or presented in another suitable form. Accordingly, in some embodiments, the controller 104 may include a communication device 136, such as a wireless communication transceiver that enables the controller 104 to communicate with other remotely located computers.

In another example, a challenge includes tracking a highest coasting distance/time ratio achieved by a driver over a designated period, and challenging the driver to beat the highest ratio. In this example, the maximum value of the coasting distance/time ratio achieved within the designated period may be used as the reference value. In one example, the best achieved coasting distance ratio is determined as the filtered value of the local maxima of the calculated coasting distance ratio. The local maxima of the coasting distance ratio are calculated in a specified time window (e.g., 60 s). The maximum of the coasting distance ratio is determined hereby for each time window, wherein for each time window a filtered value is calculated from the current maximum and the past maxima of the coasting distance ratio. The best achieved coasting distance ratio can be driver-dependent, if the driver can be identified via the ignition key, and/or vehicle-dependent. In the latter mentioned case of the vehicle-dependent coasting distance ratio, the ratio has been achieved by any driver with the motor vehicle involved. The best achieved coasting distance ratio can e.g., be reset in any driving cycle or even at any time by the driver himself.

In some embodiments, the driver may be presented with an evaluation score that indicates in summary how well the driver has succeeded in achieving or maintaining the recommended range of values for the coasting distance ratio (or another challenge). In one example, the evaluation score is incremented as the entire percentage of the time or distance, over which the driver has succeeded in maintaining the recommended range of values, wherein processing is carried out with a sliding time/distance ratio. In one particular example, the evaluation score can be classified in five different levels, wherein a non-linear scale can be used for the assignment to the respective class (or a percentage range), as given in Table 1 as follows:

TABLE 1

| Percentage of time or distance, for which the recommended range of values was maintained | Activated number of symbols (e.g., sheets, sails, etc.) |
|---|---|
| 0-0.05 | 1 |
| 0.05-0.1 | 2 |
| 0.1-0.3 | 3 |
| 0.3-0.7 | 4 |
| >0.7 | 5 |

Note that the ranges of values and corresponding scores are exemplary and other ranges and scales may be contemplated. Moreover, the scale may be visualized in a suitable manner, such as number, symbols, colors, etc.

In some embodiments, tracking of the coasting distance/time ratio for such challenges may be disregarded when operation in coasting mode is terminated by a driver independent event, such as encountering a steep road gradient, a system fault, or another operating condition. In other words, interruptions of coasting phases that are system induced or not caused by the driver are disregarded during determination of the coasting distance/time ratio.

The challenges may motivate the driver to increase the coasting distance/time ratio, and correspondingly reduce fuel consumption. It will be understood that the driver ultimately remains free to decide whether to use the displayed information to modify their driving style.

The challenges and other feedback of the driver's driving behavior may be visualized in various forms on the display device 134. In one example, the information is visualized by a gauge display indicating the driver's current coasting ratio, a recommended coasting distance/time ratio, and the driver's highest coasting distance/time ratio. In another example, the information is visualized by a point system indicating the driver's driving behavior. For example, the driver can be motivated to maintain the coasting distance/time ratio within a designated range of values in order to accrue points on an assessment scale. Different visualizations of coasting and driving behavior information that may be displayed on the display device 134 will be discussed in further detail below with reference to FIGS. 2-4.

It will be understood that the assessment of the driving behavior is preferably always active until disabled by the driver. By constantly assessing the driving behavior, the driver may be confronted with a long-term challenge and may be motivated to increase operation of the motor vehicle in coasting mode, which in turn results in an increase in fuel saving and smoother driving behavior.

In some embodiments, historic data or statistics relating to the development over time of the coasting distance ratio and coasting information may be tracked. For example, a coasting distance ratio or other information may be tracked for a given trip. By tracking coasting information from trip to trip, the learning process of the driver can be realized and displayed to the driver. Furthermore, the historical coasting data and statistics can be collected by the controller and downloaded or sent to another remote computing device for offline or remote assessment or visualized on the display device on-board the motor vehicle.

Figure 2:
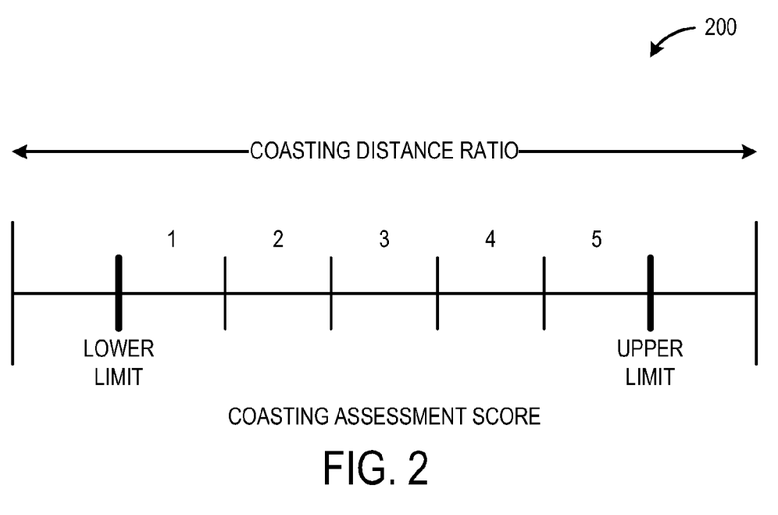
FIG. 2 shows a visualization of a coasting assessment score based on a coasting distance ratio according to an embodiment of the present disclosure.

FIG. 2 schematically shows a visualization 200 of a coasting distance ratio achieved by a driver according to an embodiment of the present disclosure. For example the visualization 200 may be displayed to the driver on the display device 134. The visualization 200 indicates a coasting assessment score on a scale from 1 to 5. The coasting assessment score is based on a percentage of the time or distance, over which the driver has succeeded in maintaining a costing distance ratio between a recommended range of values (e.g., 25-35%). In this case, the coasting distance ratio can be used to directly control a display for the coasting assessment score.

Figure 3:
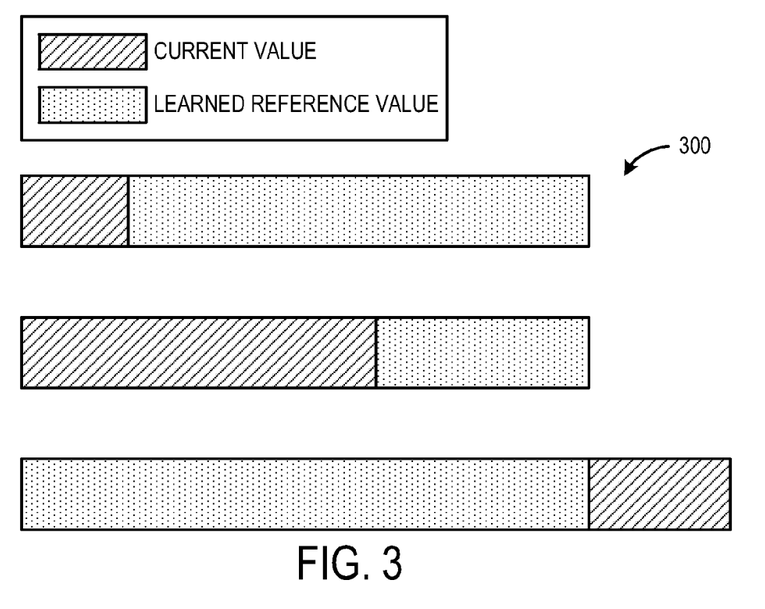
FIG. 3 shows a visualization of a driver's driving behavior according to an embodiment of the present disclosure.

FIG. 3 shows a visualization 300 of a driver's driving behavior according to an embodiment of the present disclosure. For example the visualization 300 may be displayed to the driver on the display device 134. The visualization 300 includes a progress bar that visualizes a driver's current value as compared to a learned reference value. Note that three progress bars are shown to illustrate three different examples, and in practice only one progress bar would be presented to a driver. In one example, the current value is the coasting distance ratio and the learned value is a best coasting distance ratio achieved by the driver. In another example, the learned value is an average coasting distance ratio that is calculated by incrementing the value when the driver's current coasting distance ratio is above the average and decrementing the value when the driver's current coasting distance ratio is below the average. More particularly, in some embodiments, the average may be incremented/decremented based on a driving condition (e.g., urban, extra-urban, highway, etc.) In other words, under certain driving conditions, the average may not be affected by the driving behavior of the driver. In another example, the current value is a current coasting distance over a designated period and the learned value is a best sailing distance over the designated period.

The top progress bar shows an example of a small current value relative to the learned reference value (e.g., a very low coasting distance ratio relative to an average coasting distance ratio). The middle progress bar shows a current value that is closer to the learned reference value (e.g., a below average coasting distance ratio relative to an average coasting distance ratio). The bottom progress bar shows a current value that exceeds the learned reference value (e.g., an above average coasting distance ratio relative to an average coasting distance ratio).

Figure 4:
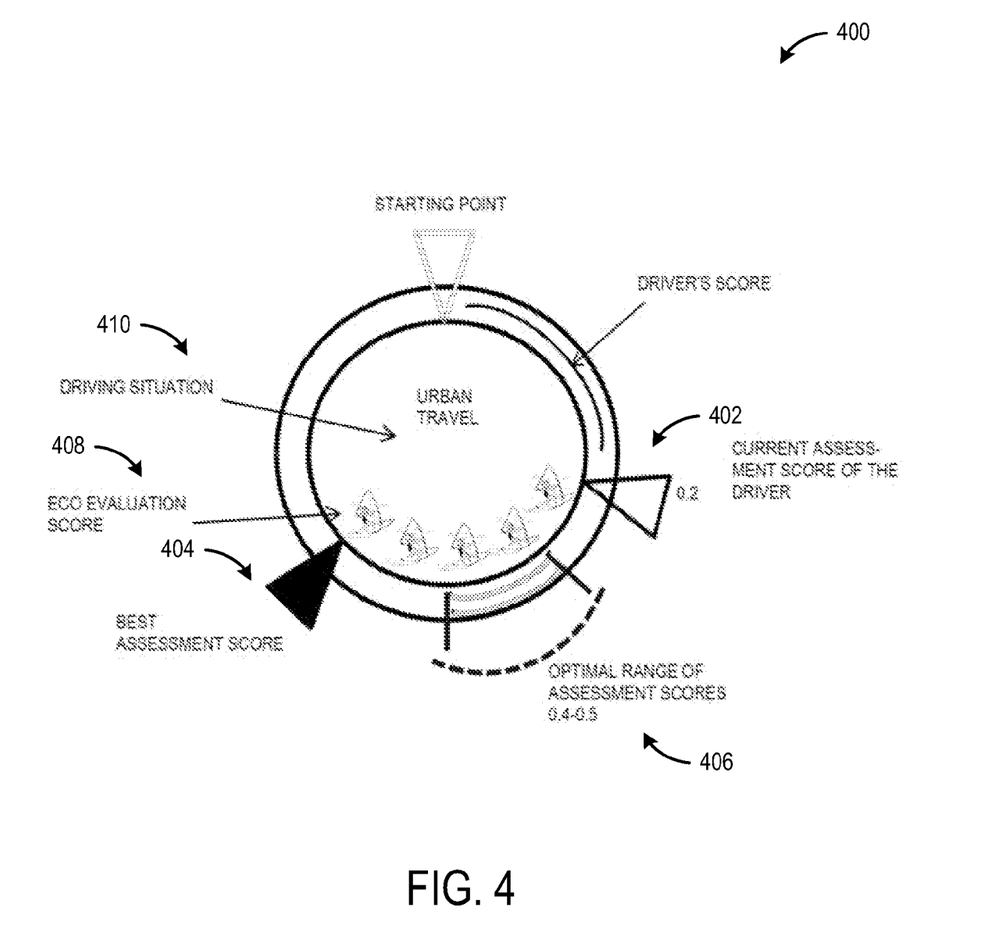
FIG. 4 shows a visualization of a drivers' driving behavior according to another embodiments of the present disclosure.

FIG. 4 shows a visualization 400 of a drivers' driving behavior according to another embodiment of the present disclosure. For example, the visualization 400 may be displayed to the driver on the display device 134. The visualization 400 includes a circular gauge that presents a current coasting distance ratio 402 achieved by the driver, a coasting distance ratio record 404 achieved by the driver to date, and a recommended range of values 406 for the coasting distance ratio. The different ratios are positioned relative to a starting point positioned at the top of the circular gauge. Further, the gauge may display an assessment score 408. The assessment score 408 may be based on how long the current coasting distance ratio falls in the recommended range of values 406. In the illustrated example, the score is represented by a corresponding number of symbols (e.g., sheets, sails etc.). In one example, the score may be based on the ranges discussed above with reference to Table 1.

In some embodiments, the current coasting distance ratio can be represented by different colors, which indicate how far the driver is away from the recommended range (e.g., "red=poor", "orange=medium", "green=good"). Moreover, the best coasting distance ratio and the recommended range of values for the coasting distance ratio can also be displayed as different colors on the gauge. Furthermore, the average coasting distance ratio may be displayed as a separate marker on the gauge. In some embodiments, the current driving condition 410 (e.g., urban, traffic congestion, expressway etc.) may be display on the gauge.

Figure 5:
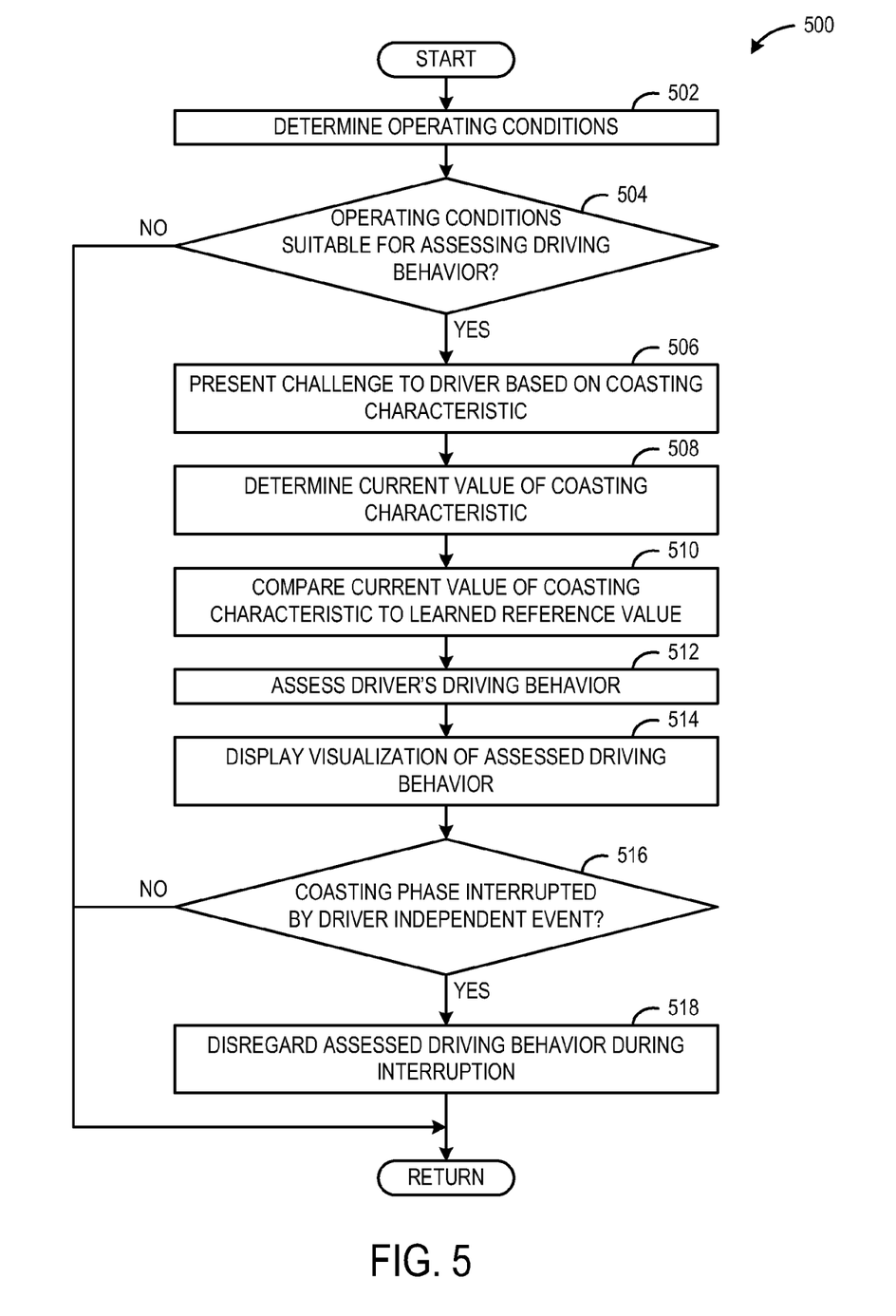
FIG. 5 shows a method for assessing a driver's driving behavior according to an embodiment of the present disclosure.

FIG. 5 shows a method 500 for assessing a driver's driving behavior according to an embodiment of the present disclosure. For example, the method 500 may be implemented as instructions stored in the storage device 122 and executed by the processor 118 of the controller 104 of the motor vehicle system 100 shown in FIG. 1

At 502, the method 500 includes determining operating conditions. For example, determining operating conditions may include receiving sensor signals from sensors 130 of the motor vehicle system 100. Optionally or additionally, determining operating conditions may include receiving driving condition and environmental information from remote computing devices via communication device 136. For example, a position of the motor vehicle may be received from a GPS computer, traffic information for the current position may be received from a traffic monitoring application, and current weather conditions for the current position may be received from a weather service.

Furthermore, determining operating conditions may include determining a state of various actuators of the motor vehicle. For example, determining operating conditions may include determining whether the motor vehicle is operating in a coasting mode based on a position of an accelerator pedal and a state of the drive train (e.g., an open state).

At 504, the method 500 includes determining whether operating conditions are suitable for assessing driving behavior of a driver. For example, during some driving conditions, coasting mode may be disabled, restricted, or interrupted independent of the driver's behavior. During such conditions, assessment of the driver's driving behavior may be disregarded. If operating conditions are suitable for assessing the driving behavior of the driver, the method 500 moves to 506. Otherwise, the method 500 returns to other operations.

At 506, the method 500 includes presenting a challenge to the driver based on a characteristic variable of a coasting strategy. The challenge may require the driving behavior of the driver to manipulate the current value of the coasting characteristic to meet challenge criteria. In one example, the challenge criteria include a specified range of values and the challenge requires the driver to maintain a coasting distance ratio within at least the specified range of values for a designated period. In another example, the challenge criteria include a relative maximum value previously achieved by the driver and the challenge requires the driver to increase the current coasting distance ratio beyond the relative maximum coasting distance ratio in a designated period. Note that in some embodiments, a difficulty of a challenge may be set based on a driver's previously assessed driving behavior.

At 508, the method 500 includes determining a current value of a characteristic variable of a coasting strategy carried out during operation of the motor vehicle. In one example, the characteristic variable is a coasting distance ratio defined as a ratio of a distance traveled by the motor vehicle while coasting (or operating in the coasting mode) relative to an overall distance traveled by the motor vehicle. In another example, the characteristic variable is a coasting time ratio defined as a ratio of an amount of time for which the motor vehicle traveled while coasting relative to an overall time for which the motor vehicle traveled. In another example, the characteristic variable is a coasting distance. Note that in some embodiments the current value may be determined after each coasting phase. In other embodiments, the current value may be determined or reevaluated continuously.

At 510, the method 500 includes comparing the current value with a reference value. The reference value is determined from operation of the motor vehicle according to the coasting strategy during at least one past operating phase of the motor vehicle. In one example, the reference value is repeatedly updated during operation of the motor vehicle. For example, the reference value may be a learned value that changes over time. As another example, the reference value may be occasionally reset either manually by the driver or automatically after a designated duration. In this way, the reference values changes as the driver's driving behavior changes. In one example the reference value is determined for a specific driver. In one example, a maximum value of the characteristic variable achieved within a specified past time window is used as the reference value. In one example, an average value of the characteristic variable achieved within a specified past time window is used as the reference value.

Note that the reference value is not a permanently fixed value stored in the ROM; rather the reference value is driver specific and changes over time. In some embodiments, the reference value may be determined based on current driving conditions (e.g., city driving, highway driving, etc.) For example, the reference value may be set higher during city driving conditions relative a reference value during highway driving conditions.

Furthermore, in some embodiments, the reference value may be shifted according to the driver's previously assessed behavior. For example, when a driver's driving behavior is assessed to be very good, then the reference value can be shifted to make it more challenging for the driver to meet a challenge. Correspondingly, when a driver's driving behavior is assessed to be very poor, then the reference value can be shifted to make it less challenging for the driver to meet a challenge.

At 512, the method 500 includes assessing the driving behavior of the driver on the basis of the comparison. For example, assessing the driving behavior may include assigning a score indicating how well the driver abides by the coasting strategy. In one example, the score indicates how well the driver maintains the characteristic variable of the coasting strategy within a specified range of values. In particular, the score may be assigned based on how long (e.g., distance or time) the driver maintains the coasting distance ratio in a range of 25-35% (or another suitable range). In another example, the score may be based on how long the driver maintains the coasting distance ratio above an average costing distance ratio for a given period.

At 514, the method 500 may include displaying a visualization comparing the current value with the reference value for the driver on a display device (e.g., display device 134 shown in FIG. 1). Additionally or optionally, the method 500 may include displaying the score indicating the driver's driving behavior on the display device. In some embodiments, the visualization may be representative of assessed driving behavior of the driver in relation to meeting the challenge criteria. In one example, the visualization may be represented by a gauge that displays a current coasting distance ratio, a recommended coasting distance ratio, and a highest achieved coasting distance ratio.

At 516, the method 500 includes determining whether operation in the coasting mode is interrupted by a driver independent event that terminates a coasting phase. For example, a driver independent even may include a steep road gradient, a system fault, or another operating condition where the controller intervenes to interrupt operation in the coasting mode. If the coasting phase is interrupted by a driver independent event, then the method 500 moves to 518. Otherwise, the method 500 returns to other operations.

At 518, the method 500 includes disregarding the assessment of the driver's driving behavior as a result of the driver independent event. For example, an assessment of driving behavior for the most recent coasting phase may be disregarded or not counted toward tracking of the characteristic value of the coasting strategy.

The above described method may be performed to assess driving behavior of a driver based on a coasting strategy and to provide feedback to the driver representative of the assessed driving behavior. The method may be used to coach the driver and motivate them to smooth their drive style in order to reduce fuel consumption. Note that the assessment may not provide a precise indication about fuel savings or emissions because it may be difficult for a driver to connect a certain driving action with a certain fuel savings. Rather, the method may teach a driver to coast as much as possible in order to reduce fuel consumption.

It will be understood that the strategy of coasting can be used in connection with any suitable drive train technology that enables automatic opening of the drive train. In the simplest case, this can take place with a power shift transmission having automatically operated clutches. Thereby, according to a general rule the activation of coasting can always take place when the gas pedal is released. In order to reduce brake wear, coasting is terminated when the driver operates the brake pedal, and coasting is only activated again if the gas pedal is operated again.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for assessing a driver's ability to coast in a motor vehicle, comprising:
    assessing a driving behavior of the driver according to a comparison of a current value of a coasting characteristic during operation of the motor vehicle relative to a reference value of the coasting characteristic from operation of the motor vehicle during at least one past operating phase;
    displaying a visualization representative of assessed driving behavior of the driver, wherein the visualization includes a gauge including a current coasting distance ratio, an average coasting distance ratio, and a relative maximum coasting distance ratio achieved by the driver.

2. The method of claim 1, wherein the coasting characteristic is a coasting distance ratio defined as a ratio of a distance traveled by the motor vehicle while coasting relative to an overall distance traveled by the motor vehicle.

3. The method of claim 2, wherein the reference value is the average coasting distance ratio for a designated duration or the relative maximum coasting distance ratio achieved by the driver for a designated duration.

4. The method of claim 1, further comprising:
    presenting a challenge to the driver, wherein the challenge requires the driver to alter their driving behavior to manipulate the current value of the coasting characteristic to meet challenge criteria.

5. The method of claim 4, wherein the challenge criteria includes maintaining the current value within a specified range of values or increasing the current value beyond a relative maximum coasting distance ratio previously achieved by the driver.

6. The method of claim 1, further comprising:
    disregarding the assessed driving behavior of the driver in response to encountering a driver independent interruption of coasting.

* * * * *